United States Patent [19]

Bonner et al.

[11] 3,733,904
[45] May 22, 1973

[54] TEMPERATURE COMPENSATED GAS METER REGISTER

[75] Inventors: Joseph A. Bonner, Pittsburgh; Howard J. Evans, New Kensington, both of Pa.

[73] Assignee: Rockwell Manufacturing Company, Pittsburgh, Pa.

[22] Filed: Jan. 4, 1971

[21] Appl. No.: 103,365

[52] U.S. Cl. ................................................73/233
[51] Int. Cl. ..........................G01f 3/00, F01f 15/04
[58] Field of Search..........................................73/233

[56] References Cited

UNITED STATES PATENTS

| | | | |
|---|---|---|---|
| 3,224,273 | 12/1965 | Granberg | 73/233 |
| 3,580,073 | 5/1971 | Siebold | 73/233 |
| 3,299,705 | 1/1967 | Shallenberg et al. | 73/233 |
| 3,169,399 | 2/1965 | Allport et al. | 73/233 |
| 1,881,572 | 10/1932 | Herz | 73/233 |
| 2,302,529 | 11/1942 | Cornell et al. | 73/233 X |
| 2,886,969 | 5/1959 | Dufour | 73/233 |

*Primary Examiner*—Richard C. Queisser
*Assistant Examiner*—John P. Beauchamp
*Attorney*—Straugh, Nolan, Neale, Nies & Kurz

[57] ABSTRACT

A gas meter assembly wherein a positive displacement meter disposed in a conduit through which flows gas to be measured is connected through a gear transmission unit to drive both corrected and uncorrected volume indicating registers, the unit comprising an initial gear train common to the drive to both registers, a first branch gear train connecting the initial gear train to the uncorrected register, a second branch gear train connecting the initial gear train to a shaft in the drive to the corrected register and a cam actuated unidirectional clutch connected to impart additive rotation to that shaft in accord with the gas temperature in the conduit, for continually automatically modifying the drive to said corrected register to correct the indicated volume to a predetermined base temperature.

9 Claims, 8 Drawing Figures

PATENTED MAY 22 1973

INVENTORS
JOSEPH A. BONNER
HOWARD J. EVANS

BY Strauch, Nolan, Neale, Nies & Kurz
ATTORNEYS

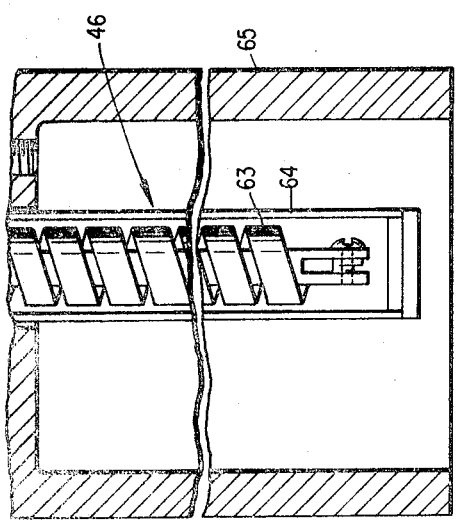
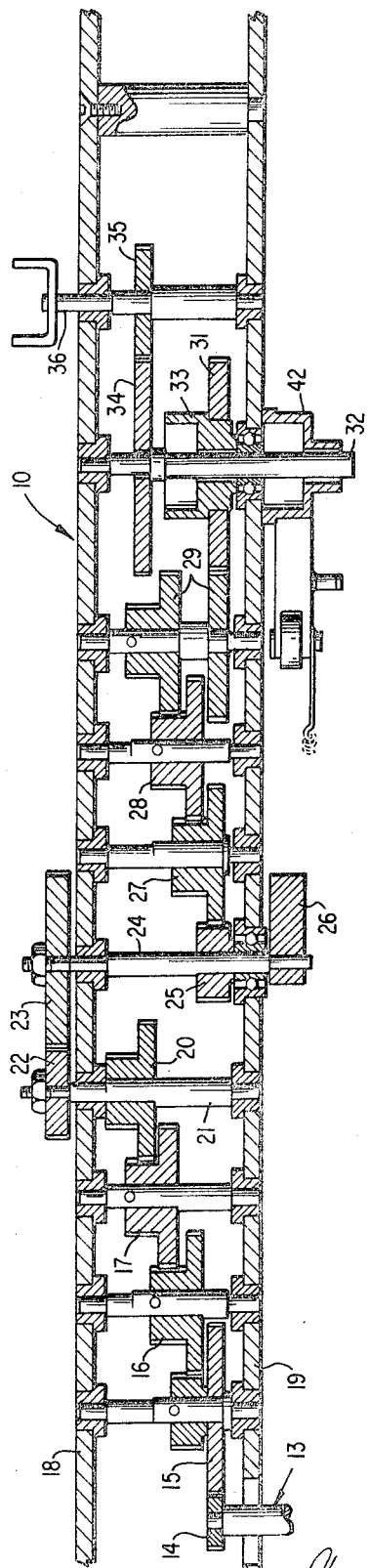
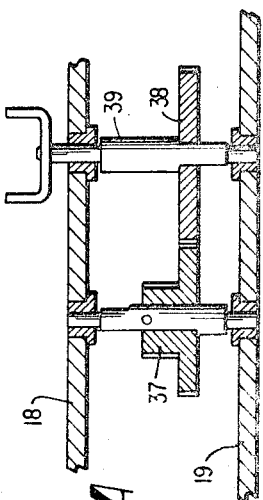
FIG. 3A
FIG. 4
FIG. 4A
INVENTORS
JOSEPH A. BONNER
HOWARD J. EVANS

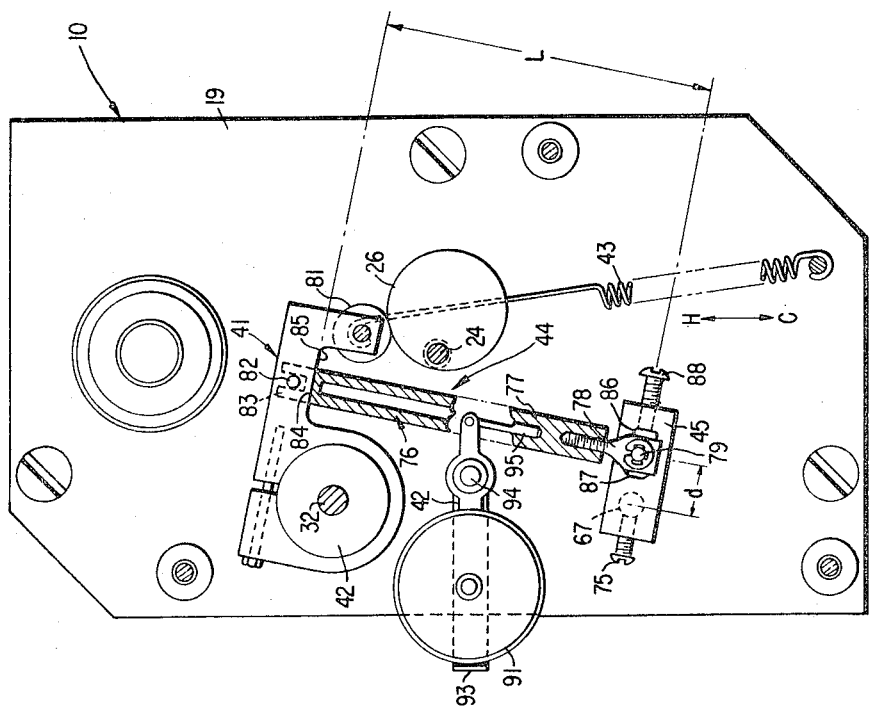
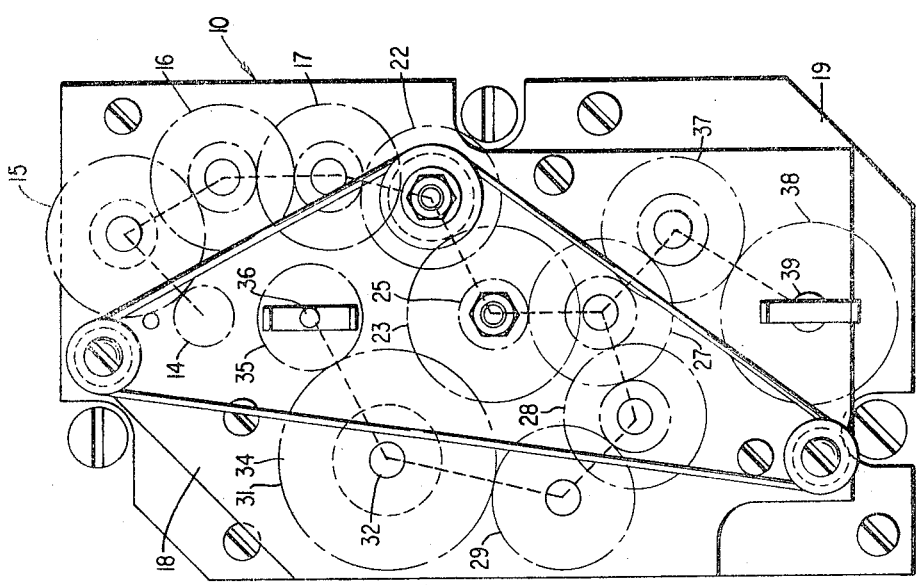

TEMPERATURE COMPENSATED GAS METER REGISTER

This invention relates to fluid meter register apparatus, and particularly to gas meter register apparatus wherein motion transmitting mechanism between a meter and a register is automatically corrected to relate the volume indication of the register to a base temperature.

BACKGROUND OF THE INVENTION

In the conventional gas meter the meter output shaft is connected by suitable motion conversion mechanism to actuate a register which records volume of gas flow, usually in cubic feet.

Gas is conducted to and from the meter in a conduit, and the temperature of the gas being metered may vary from time to time. It therefore for the sake of uniformity and accuracy has long been the practice to correct reading of the register to indicate the volume of gas passing through a meter with reference to a base temperature, usually about 60° F. Such prior practice may be noted by reference to U.S. Pat. No. 1,881,572 issued Oct. 11, 1932 to Herz. More recently temperature compensated gas volume registration has been disclosed in U.S. Pat. No. 3,169,399 issued Feb. 16, 1965 to Allport et al. Other patents disclosing different modes of temperatures compensation in gas meters are Ruffer U.S. Pat. No. 3,266,310 and Rose U.S. Pat. Nos. 3,334,519 and 3,358,506.

The present invention provides novel apparatus that represents improvement and simplicity with respect to the foregoing, and wherein the meter output is connected to a register through a drive mechanism unit that may be continually modified by improved control means responsive to the temperature of the gas being metered to reliably continually correct the register indicated volume to a base temperature, and this is the major object.

Another object of the invention is to provide a novel gas metering apparatus wherein a cam controlled unidirectional clutch means driven from the meter imparts periodic compensative movement to a meter driven shaft in a register drive system and means responsive to the temperature of the gas being metered controls the amplitude of such movement to correct the volumetric indication of the register to a base temperature.

A further object of the invention is to provide a novel meter register drive wherein a shaft connected to actuate the register is geared substantially directly to the meter output and a temperature compensating drive derived from the meter output and automatically continually modified in accord with the temperature of the gas being metered is connected to impart additive movement to the shaft for correcting the volumetric indication of the register to a base temperature.

It is an object of the invention to provide in a temperature compensating drive between a meter and a shaft in the register drive system novel mechanism comprising a unidirectional clutch connected to the shaft and actuated by a lever that is periodically rocked by a cam driven from the meter, the amplitude of rocking being determined by a device positioned in response to the temperature of the gas being metered. More specifically this device may be a stop for limiting spring biased movement of said lever toward the cam.

Another object of the invention is to provide in a drive system between a positive displacement gas meter and volume indicating register means a novel drive gear unit having an input connected to the meter output shaft and separate outputs connected to corrected and uncorrected volumetric registers, compensating mechanism for the corrected register being carried by the gear unit and connected to be controlled by temperature sensitive means exposed to the gas being metered.

Further objects of the invention will appear as the specification proceeds in connection with the drawings, particularly as to details such as the provision of a special gear unit in the register drive, the adjustable movable connecting mechanism between the lever stop and a suitable temperature sensitive element, and the various related mountings and operative associations of the parts to be described.

BRIEF DESCRIPTION OF DRAWINGS

FIG. 3A is a fragmentary view in section comprising an effective extension of FIG. 3 showing the shielded end of the thermally sensitive unit within the flow conduit;

FIG. 4 is a section showing detail of the transmission gearing assembly unit;

FIG. 4A is a fragmentary section showing an extension of the FIG. 4 gearing unit to the drive for the uncorrected register;

FIG. 5 is a section substantially on line 5—5 of FIG. 3 showing the gearing arrangement; and FIG. 6 is a section substantially on line 6—6 of FIG. 3 showing the temperature compensation mechanism in the corrected drive.

PREFERRED EMBODIMENTS

Figure 1:
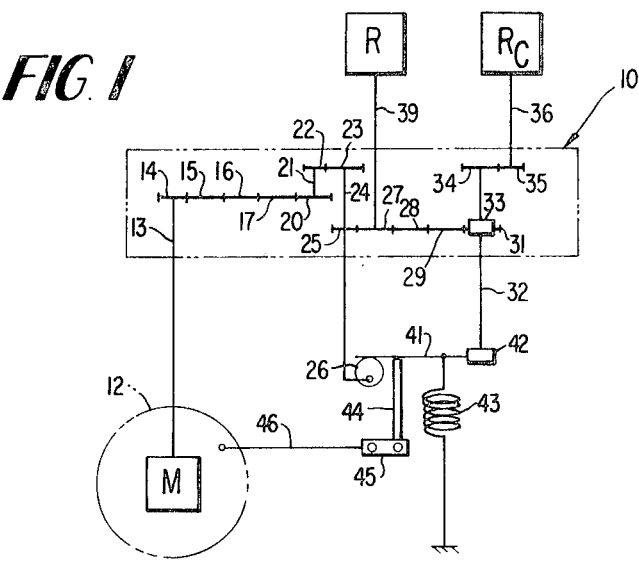
FIG. 1 is a diagrammatic view illustrating a register drive system for a gas meter assembly according to a preferred embodiment of the invention.

FIG. 1 diagrammatically illustrates the novel association of system components according to a preferred embodiment of the invention.

Figure 2:
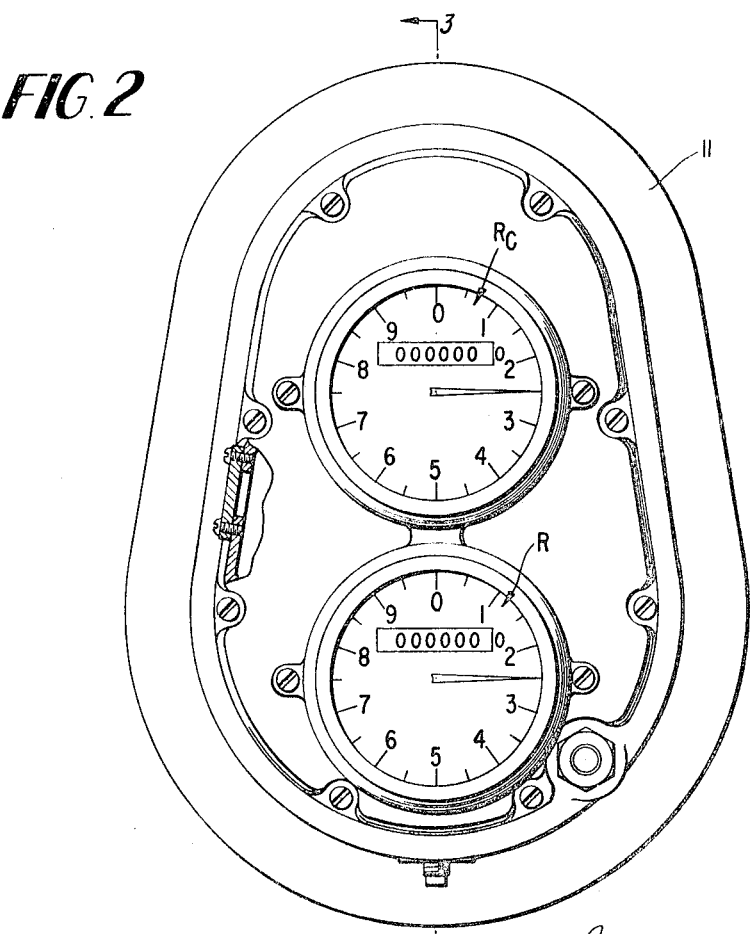
FIG. 2 is a front view of the register assembly.

The front side of the register assembly indicated at 11 in FIG. 2 displays the uncorrected register R and the corrected register Rc. These registers record fluid flow through the conduit 12 which drives the meter device M therein.

Meter device M is preferably of the positive displacement type, and advantageously may be the meter disclosed in Karlby et al. U.S. Pat. No. 3,255,630 issued June 14, 1966.

Referring to FIGS. 1, 4 and 4A driven shaft means 13 at the meter output enters the transmission gear assembly unit 10 of the register assembly at a first or input gear 14. Gear 14 is connected by meshed gears 15, 16, and 17 within the space between fixedly connected parallel mounting plates 18 and 19 of the transmission assembly unit to a gear 20 on a rotatable shaft 21 that projects through plate 18 to mount a calibration gear 22. Gear 22 is meshed with a second calibration gear 23 on a parallel rotatable shaft 24 that extends through both plates 18 and 19 to mount a gear 25 within the space and an eccentric cam 26 outside plate 19. The calibration gears 22,23 may be substituted for by a pair of gears providing a different ratio drive to the registers, during initial calibration of the assembly.

Gear 25 meshes with a gear train 27, 28, 29, and 31 within the transmission assembly space, gear 31 being mounted on and connected to rotate a shaft 32 through a conventional one-way clutch 33. Shaft 32 which is supported in unit 10 also carries a gear 34 meshed with a gear 35 fixed on rotatable output shaft 36 that drives the compensated register Rc. As shown in FIGS. 4A and 5 a gear 37 which is also meshed with gear 27 is meshed with gear 38 fixed on rotatable output shaft 39 that drives the uncorrected register. Gears 38 and 39 are not shown in diagrammatic FIG. 1. The drive connections between shafts 36 and 39 and the respective registers are conventional.

As diagrammatically shown in FIG. 1, eccentric cam 26 during rotation periodically rocks a lever 41 connected through a second unidirectional drive clutch 42 to shaft 32. Lever 41 and cam 26 are shown 90° displaced for clarity of illustration of function Clutches 33 and 42 may be of any conventional type such as the ball wedge type disclosed in Marsh U.S. Pat. No. 2,438,934, and they are adapted to impart the same direction of rotation to shaft 32.

Return of lever 41 by spring 43 is limited by a stop assembly 44 positioned by a rockable actuating arm 45, that may alter the location of the stop relative to lever 41 through means including a probe 46 that extends into the conduit 12 and is thus responsive continuously to the temperature of the fluid being metered.

Figure 3:
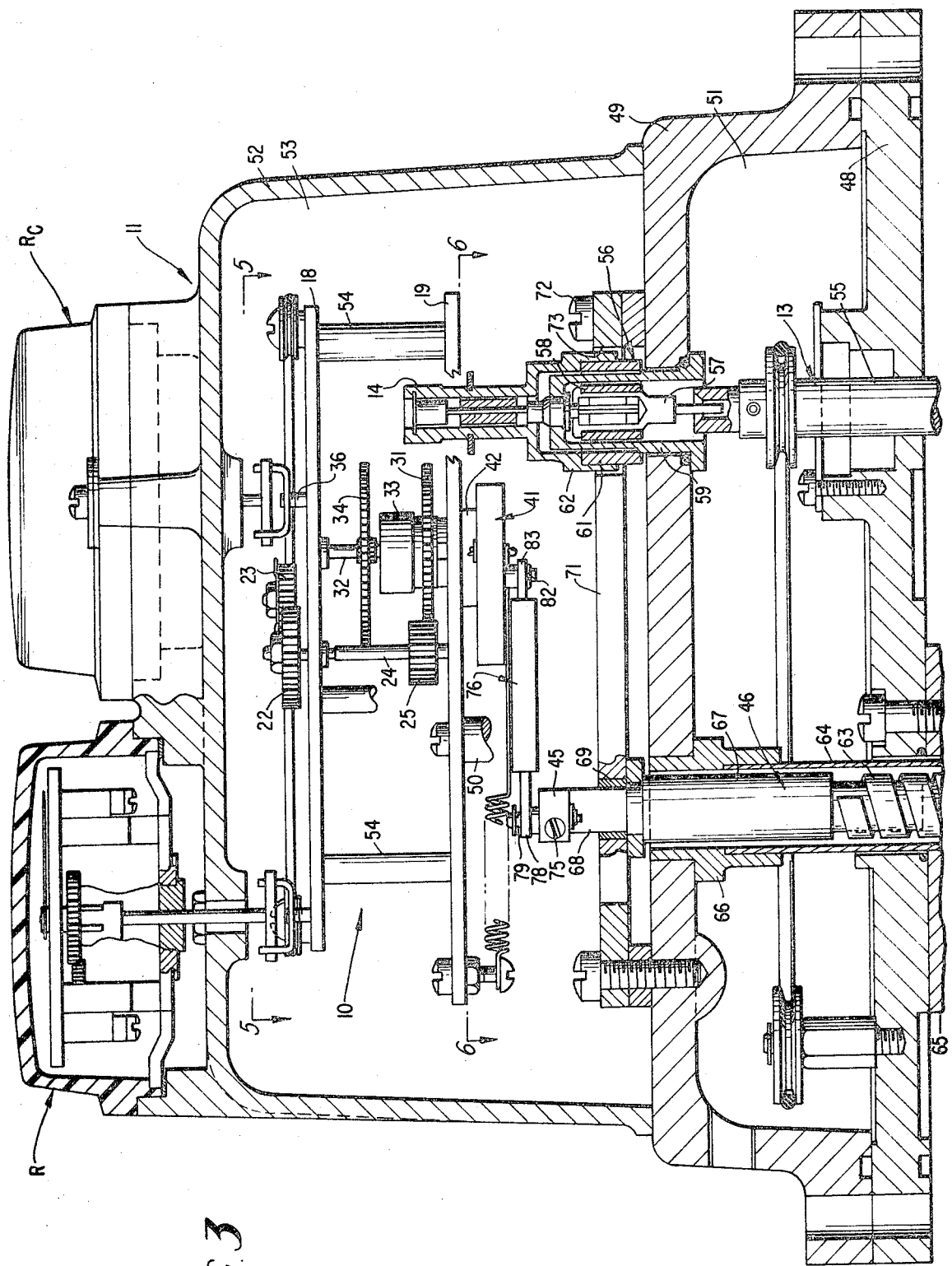
FIG. 3 is an enlarged section substantially on line 3—3 of FIG. 2 showing internal detail of the drive to the corrected and uncorrected registers.

Referring to FIG. 3, the register assembly 11 is mounted on a plate 48 that may be suitably secured over an opening in the side of conduit 12. A base 49 defining a chamber 51 is secured on plate 48, and a cup-shaped casing 52 is secured upon the base to define a mechanism chamber 53. The gear assembly unit 10 is suitably fixedly but removably mounted in chamber 53 as by supports 50 (FIG. 3) suitably rigid with base 49. Plates 18 and 19 are fixedly spaced by posts 54.

Meter driven shaft means 13 which constitutes the input to the register drive system comprises a shaft 55 connected by a fluid tight magnetic drive unit 56 to a shaft bearing input gear 14. The drive unit comprises a shaft 57 carrying a drive magnet 58 housed by a fixed well 59 of non-magnetic material, and a cooperating driven magnet 61 mounted on a rotatable shaft 62 carrying gear 14.

The probe for controlling the stroke of lever 41 may comprise a temperature sensitive element 63 preferably in the form of a coiled Bourdon tube surrounded by a protective shell 64 and extending through a shield 65 attached to the bottom of plate 48 and projecting within conduit 12. Shell 64 has one end fixed in a fitting 66 rigid with base 49. Element 63 is of a known type per se that upon change in temperature of the fluid contacting it produces proportional rotation of an attached shaft 67 about its longitudinal axis.

The reduced diameter end 68 of shaft 67 extends through a bushing 69 lining an opening in a mounting plate 71 removably secured to base 49 as by screws 72. Shaft 62 of the meter drive extends freely through a suitable opening 73 in plate 71.

As shown in FIGS. 3 and 6, shaft end 68 extends into an opening in the actuating arm 45 and is non-rotatably fixed to arm 45 as by set screw 75. By releasing screw 75 the angular position of arm 45 on shaft 67 may be adjusted. The stop assembly 44 comprises an adjustable link unit 76 consisting of a link 77 formed at one end with a threaded bore rotatably adjustably mounting a threaded pivot member 78 which carries a pivot 79 for pivotally connecting arm 45 in eccentric relation to the axis of shaft 67.

As shown in FIG. 6, clutch lever 41 extends from shaft 32 and carries a freely rotatable follower roller 81 that is constantly urged by spring 43 against the periphery of eccentric cam 26. Spring 43 is a tension spring anchored at opposite ends on lever 41 and plate 19.

Intermediate it ends lever 41 has a fixed laterally projecting guide pin 82 slidably disposed in the slotted or bifurcated upper end 83 of link 77. A transverse end surface 84 on link 74 acts as a stop surface adapted to be abutted by the lower surface 85 of lever 41 during operation. Adjustment of member 78 may be effected by detaching it from arm 45 and rotating it in its threaded bore. This adjustment will vary the effective length L of the link for determining the distance of stop surface 84 from arm 45.

Preferrably pivot 79 is carried by a block 86 slidably adjustable along a slot 87 in arm 45, and the distance d between the center of rotation of shaft 67 and the pivot 79 may be adjusted by a set screw 88 threaded in arm 45 and in block 86. This adjustment varies the amount of displacement of stop surface 84 per degree of rotation of shaft 67. The angular adjustment of arm 45, and length adjustment of link 77 and the adjustment of pivot 79 are all calibration adjustments for the meter assembly.

A fixed dial 91 is associated with an indicator lever 92 having an index 93 adjacent the graduated dial periphery. Lever 92 is intermediately pivoted at 94 and has an end pivotably connected to a stud 95 secured to and movable longitudinally with link 77. The periphery of dial 91 is preferably graduated to show temperature in degrees Centigrade.

In brief in operation meter shaft means 13 is rotated by gas flowing in conduit 12. Drive is transmitted through gears 14, 15, 16, 17, 20, shaft 21, calibration gears 22 and 23, shaft 24 and gear 25 to gear 27. This initial gear train of the gear unit 10 is common to the drive to both registers. The uncorrected register R is driven from gear 27 through a first branch train comprising gears 37 and 38 and shaft 39. The corrected register Rc is driven from gear 27 through a second branch train comprising gears 28, 29 and 31, clutch 33, shaft 32, gears 34 and 35 and shaft 36.

The drive to the corrected register is continually modified. Cam 26 driven by the initial portion of the gear train periodically rocks lever 41 in a direction to impart an increment of rotation to shaft 32, additive to the continuous rotation being imparted by the second branch gear train. Lever 41 is spring biased for return movement during which it imparts no rotation to shaft 32.

The stop 44 of FIG. 1, or more specifically the stop surface 84 of the link 77 of FIG. 6, is positioned by the thermally responsive means at a point in the path of return movement of lever 41 in accord with the temperature of the gas being metered. This is accomplished by thermally sensitive element 63 acting in response to the gas temperature to angularly locate arm 45 and therefore position link 77 at a corresponding level in the return path of lever 41.

The dimensions and arrangement are such that should the gas temperature in the conduit be 60° F., or any other selected base temperature, surface 84 will be disposed to contact lever 41 at such a level as to permit an amplitude of rocking such that just enough additive rotation will be imparted to shaft 32 so that both the corrected and uncorrected registers will have the same volumetric reading. In a preferred embodiment, a gas temperature of about 120° F. in the conduit will result in such upward displacement of the stop 84 that the follower 81 of lever 41 will contact the rotating cam for only a limited arc of the cams travel and at a curvature on the periphery of the cam which is such that it will not rock the lever 41 at a rate greater than the rate of rotation of clutch 33 and, therefore, no additive movement will be imparted to shaft 32, wherefore the volumetric reading at the corrected register will be low. Where the gas temperature falls below 60° F. the corrected register will show a proportionately larger volume due to the added effective stroke action of lever 41.

It is recognized that variations in gas pressure in the conduit will affect the volumetric readings at the registers, but the above-described meter assembly is intended for use in a relatively main gas line wherein pressures are reliably held fairly constant, at least within acceptable units. This pressure is usually monitored and recorded, and after a reading is taken at the registers a suitable correction factor to correct to a selected base pressure may be applied.

For practical purposes therefore, the temperature compensated gas meter assembly herein described is adequate, and is considerably less expensive than the relatively complex assemblies which endeavored to correct volume for both pressure and temperature.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a meter assembly for measuring the volume of gas corrected to a predetermined base temperature, a cummulative volume indicating register; a gear transmission unit interposed between said register and a meter disposed in a conduit through which flows the gas to be measured, said unit including a shaft conected to be continuously rotated in a predetermined direction by said meter; compensating means comprising a continuously rotatable cam connected to be driven from said unit and a lever periodically rockably moved by said cam and connected to said shaft for imparting added rotational movement to said shaft in said predetermined direction; and means responsive to the temperature of the gas being metered for continually controlling the degree of said added rotational movement, said temperature responsive means comprising an arm rockable about a fixed pivot, thermally sensitive means exposed to the gas being measured and connected to angularly rock said arm upon a change in temperature of said gas, a link pivoted at one end to said arm eccentrically with respect to said fixed pivot and having a stop surface at its other end adapted to be engaged by said lever, and adjustment means for said link to adjust said stop surface to a predetermined initial position with respect to said lever.

2. In the meter assembly defined in claim 1, said other end of said link having a slide pivot connection to said lever adjacent said stop surface.

3. In the meter assembly defined in claim 1, said adjustment means including means for adjusting the angularity of said arm about its fixed pivot.

4. In the meter assembly defined in claim 1, said adjustment means including means for adjusting the distance between said fixed pivot of said arm and the pivotal connection of said arm to said link.

5. In the meter assembly defined in claim 1, said adjustment means including means for adjusting the effective length of said link between said arm and said stop surface.

6. In the meter assembly defined in claim 1, temperature indicating means operably connected to said link for indicating the temperature of the gas being metered.

7. In a gas meter assembly of the type wherein the output of a positive displacement meter disposed in a conduit through which flows gas to be measured is connected through a gear transmission unit to drive both corrected and uncorrected volume indicating registers, said unit comprising an initial gear train common to the drive to both registers, a first branch gear train connecting said initial gear train to drive the uncorrected register, a second branch gear train driven from said initial gear train, a rotatable shaft drive connected to the corrected register, a first unidirectional clutch on said shaft drive connecting said second branch gear train to said shaft to rotate said shaft in a predetermined direction, and compensating means driven from said initial gear train and controlled by the gas temperature in said conduit for continually automatically modifying the drive through said second branch gear train to said rotatable shaft and corrected register to correct the indicated volume to a predetermined base temperature, said compensating means including a second unidirectional clutch on said shaft, a drive mechanism connecting said initial gear train to said second clutch for imparting added rotational movement to said shaft in said predetermined direction, and thermally sensitive means responsive to the temperature of the gas being metered for continually controlling the degree of said added rotational movement.

8. In the gas meter assembly defined in claim 7, said initial gear train including a pair of meshed gears disposed to be readily removable and replaceable by another pair of meshed gears having a different ratio, for meter calibration.

9. In a gas meter assembly as defined in claim 7, said mechanism comprising a cam driven by said initial gear train and a follower lever connecting the cam to the second unidirectional clutch, and means connected to be positioned by said thermally sensitive means and operatively associated with said lever for determining the increment of rotation imparted thereby to said shaft.

* * * * *